(12) United States Patent
Sassenrath et al.

(10) Patent No.: US 12,309,036 B2
(45) Date of Patent: *May 20, 2025

(54) REVERSE WIRELESS DISCOVERY FOR ADDING AN IOT DEVICE TO AN IOT ECOSYSTEM

(71) Applicant: Roku, Inc., San Jose, CA (US)

(72) Inventors: Carl Sassenrath, Reno, NV (US); Greg Garner, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,057

(22) Filed: Sep. 13, 2023

(65) Prior Publication Data

US 2025/0016056 A1    Jan. 9, 2025

Related U.S. Application Data

(63) Continuation of application No. 18/348,117, filed on Jul. 6, 2023, now Pat. No. 11,792,080.

(51) Int. Cl.
*H04L 41/12* (2022.01)
*H04L 67/12* (2022.01)
*H04W 8/00* (2009.01)
*H04W 48/10* (2009.01)

(52) U.S. Cl.
CPC .............. *H04L 41/12* (2013.01); *H04L 67/12* (2013.01); *H04W 8/005* (2013.01); *H04W 48/10* (2013.01)

(58) Field of Classification Search
None
See application file for complete search history.

(56) References Cited

U.S. PATENT DOCUMENTS

| | | | |
|---|---|---|---|
| 9,955,526 | B1 | 4/2018 | Yu |
| 10,587,482 | B2 | 3/2020 | Harat et al. |
| 10,834,586 | B2 * | 11/2020 | Christopher .......... H04W 12/06 |
| 11,356,440 | B2 * | 6/2022 | Mangalvedkar ........ H04W 4/50 |
| 2019/0208024 | A1 | 7/2019 | Jablonski |
| 2019/0239068 | A1 * | 8/2019 | Mudulodu ............ H04L 9/3226 |
| 2020/0351156 | A1 * | 11/2020 | Zhang ................... H04W 12/50 |

* cited by examiner

*Primary Examiner* — Hong S Cho
(74) *Attorney, Agent, or Firm* — McDonnell Boehnen Hulbert & Berghoff LLP (57) ABSTRACT

A method and system to facilitate adding a new IoT device to an IoT ecosystem that includes an existing IoT device, where a mobile device is configured to control the IoT ecosystem. In an example, the new device detects a wireless broadcast from the existing device that provides identification information of the mobile device. In response, the new device then uses the provided identification information of the mobile device as a basis to scan for and discover wireless presence of the mobile device. And responsive to the discovering wireless presence of the mobile device based on the mobile-phone identification information provided by the existing device, the new device then transmits to the mobile device, via the existing device as a wireless proxy, new-device information about the new device—which enables the mobile device to prompt for and obtain user approval to add the new device to the IoT ecosystem.

20 Claims, 6 Drawing Sheets

REVERSE WIRELESS DISCOVERY FOR ADDING AN IOT DEVICE TO AN IOT ECOSYSTEM

REFERENCE TO RELATED APPLICATION

This is a continuation of U.S. patent application Ser. No. 18/348,117, filed Jul. 6, 2023, the entirety of which is hereby incorporated by reference.

SUMMARY

A typical Internet of Things (IoT) ecosystem includes a number of IoT devices (i.e., physical "things"), typically nonstandard computing devices configured to carry out useful functions and arranged to connect wirelessly or otherwise with a network and engage in data communications with each other and with local or cloud-based IoT control applications, among other possibilities.

There are countless examples of IoT devices. In the consumer space, for instance, examples include smart light switches, video doorbells, power outlets, thermostats, window treatment, lightbulbs, locks, cameras, and security systems, among others. And in the commercial space, examples include smart vehicles, healthcare monitors and other equipment, power grids, environmental monitors, and agricultural equipment, among others.

In an example arrangement, a user (e.g., a person, a company, etc.) may own and/or operate a set of one or more IoT devices cooperatively defining an IoT ecosystem associated with the user. For instance, the user may have an IoT service account with an IoT service provider that provides or operates according to an IoT framework defining a set of protocols, tools, and standards for IoT applications and services. And the user may have a number of IoT devices that are compliant with that IoT framework and registered with the user's IoT service account.

Further, as part of the IoT framework, the IoT service provider may operate a cloud-based IoT control server and may provide the user with access to mobile and/or web-based IoT control apps that enable the user to interact with and control the IoT devices registered with the user's IoT account. For instance, the IoT service provider may provide a mobile IoT control app that the user could install on the user's mobile device (e.g., mobile phone, tablet, wearable device, etc.) and associate with the user's IoT account, and through which the user could then engage in this IoT interaction and control. Further, the IoT service provider may operate a website through which the user could log in to the user's IoT account to engage in this interaction and control.

By way of example, a user may acquire and register to the user's IoT account a number of IoT devices for use in the user's home and may be able to control those devices from a mobile or web-based IoT control app. For instance, the user may acquire a smart lightbulb, screw the lightbulb into a wall-powered lamp, and register the lightbulb with the user's IoT account, so that the user can then use the IoT control app to control the on/off state of the lamp. Further, the user may acquire a smart plug, connect the smart plug to a standard power outlet, connect a table fan to the smart plug, and register the smart plug with the user's IoT account so that the user can then use the IoT control app to control the on/off state of the smart plug and thus the on/off state of the connected table fan. Still further, the user may acquire a video doorbell, connect the video doorbell at the front door of the user's home, and register the video doorbell with the user's IoT account so that the user can then use the IoT control app to monitor activity at the front door and possibly interact in real time with people at the front door.

IoT devices that are in a user's IoT ecosystem and are compliant with a given IoT framework may be configured to interact with each other and with an associated IoT control system according to the IoT framework. To facilitate this interaction, the IoT devices may each be configured to engage in wireless and/or wired network communication. For instance, each IoT device may be equipped with one or more wireless network interfaces, such as WiFi, Bluetooth, and/or ultra-wideband (UWB) adapters, among other possibilities.

Being equipped with WiFi adapters, for instance, may enable the IoT devices to be served by a WiFi access point and to communicate through the WiFi access point with devices on a local area network (LAN) and on the internet. This could in turn allow the IoT devices to interact with a LAN-based IoT control platform such as an IoT control app running on a WiFi-connected mobile device. Further, this could allow the IoT devices to interact with a cloud-based IoT control server operated by the IoT service provider. To facilitate this communication, the IoT devices may further be provisioned with a WiFi service set identifier (SSID), WiFi channel, and any WiFi security credentials used by the access point, in order to connect, authenticate, and associate with the access point.

Further, being equipped with WiFi adapters may enable the IoT devices to engage in direct WiFi communication with each other, and to establish and communicate with each other over a WiFi mesh network or other arrangement of ad-hoc inter-device communications. For instance, the IoT devices may use their WiFi adapters to broadcast WiFi signals indicating their presence and to detect such broadcasts from each other, and to engage in further WiFi signaling with each other to ultimately establish a web of peer-to-peer WiFi connections between each other. This WiFi mesh network may enable the IoT devices to communicate with each other through others of the IoT devices, which may also provide a path through an edge node to gain access to a WiFi access point in order to interact with IoT control systems on the LAN or internet.

An example IoT framework may establish some framework-specific WiFi signaling characteristics that the IoT devices compliant with the IoT framework could use for such direct or mesh network WiFi communication with each other. Without limitation, this may include a framework-specific WiFi frame format, security parameters, and/or coding techniques. Operating with these or other framework-specific WiFi signaling characteristics may enable the IoT devices that are compliant with the IoT framework to securely engage in WiFi communication with each other and to distinguish WiFi communications of framework-compliant IoT devices from WiFi communications of other devices.

In general, each IoT device and other device that supports network communication may have a respective Media Access Control (MAC) address, which is a permanent or semi-permanent hardware address that uniquely identifies the device. Typically assigned to a device during manufacturing, the MAC address may be included in a header of network communications transmitted to and from the device, to indicate that the network communications are to or from that device in particular. For instance, when a device transmits WiFi signaling, the device may specify its MAC address within WiFi frame headers, as a source MAC address and thus as an indication that the WiFi signaling comes from the device associated with that MAC address.

A MAC address may have components that are keyed to the device's manufacturer and possibly to the device's model and/or other device descriptive information. It may therefore be possible to determine the brand, model, and/or other information about a device based on a database lookup keyed to the device's MAC address.

Further, each IoT device and other device that supports network communication on a packet-switched network such as a LAN and/or the internet may have a respective Internet Protocol (IP) address, as a network address assigned for use by the device to engage in communication on that network. For instance, when a device connects with a WiFi access point that provides access with a LAN, the device may further register with a LAN router (possibly integrated with the access point), and the router may assign to the device a locally-routable IP address (local-IP address) for use by the device to communicate on the LAN. Further, devices that sit as nodes on the internet, including for instance the router and/or an associated modem, may each have a globally-routable IP address (global IP address) for use by the device to communicate on the internet. In addition, the router may apply network address translation (NAT) between the local IP addresses and a global IP address in order to enable LAN-based devices to communicate on the internet.

Under the example IoT framework, when a user has an IoT account with an IoT service provider, the IoT service provider may maintain at a cloud-based IoT control server an account record that specifies information about the user's IoT account and ecosystem.

This information may include an indication of the IoT devices that are registered with the user's IoT account, indicating for each IoT device the device's MAC address and other properties of the device such the device's brand, model, and capabilities. Further, this information may include other account-related information, such as information about the user's associated mobile device and information about the user's associated WiFi access point. Information about the user's mobile device may include information useable by the IoT devices to communicate with the mobile device, such as a local IP address of the mobile device, the MAC address of the mobile device, and an operating WiFi channel of the mobile device, for instance. And information about the user's WiFi access point may include information useable by the IoT devices to discover, authenticate, and associate with the WiFi access point, such as the access point's SSID, operating WiFi channel, and applicable security credentials.

In addition, IoT devices registered with the user's IoT account may similarly store this or other such information about the user's IoT account and ecosystem. For instance, each IoT device that is registered with the user's IoT account may store an indication that is it so registered, possibly with account identification information and associated information that enables the IoT device to interact with associated IoT control systems. Further, each IoT device that is registered with the user's IoT account may store a list of the other IoT devices that are registered with the user's IoT account, specifying the MAC address and possibly other properties respectively of each other IoT device. And each such IoT device may also store other account-related information such as the user's mobile-phone and access-point information noted above. This and/or other information about the user's IoT account and ecosystem may be provisioned into the user's IoT devices by pushing the information from the cloud-based IT control server to the IoT devices and/or by having the IoT devices share the information with each other.

One technical issue that could arise with this or other arrangements is how to add a new IoT device to the user's IoT ecosystem.

The "new" IoT device in this context may be a brand new IoT device or a factory-reset IoT device, among other possibilities, and may be compliant with the same IoT framework as each of one or more existing IoT devices in the user's IoT ecosystem. In an example scenario, a user may want to add the new IoT device to the user's IoT ecosystem in order to have the new IoT device interact with one or more existing IoT devices in the user's IoT ecosystem, and/or to enable the user to control the new IoT device from a mobile and/or web-based IoT control app associated with the user's IoT account.

One technique to add a new IoT device to a user's IoT ecosystem is to establish a direct wireless connection between the user's mobile device and the new IoT device, and have an IoT control app on the mobile device get information about the new IoT device through this connection and communicate with the cloud-based IoT control server to register the new IoT device with the user's IoT account.

Establishing this direct wireless connection between the user's mobile device and the new IoT device may involve putting the new IoT device into a Bluetooth pairing mode or a WiFi soft-access-point (soft-AP) mode, and then having the user's mobile device wirelessly scan for and discover presence of the new IoT device in that mode. Once the mobile device thereby discovers the presence of the new IoT device that is in the pairing or soft-AP mode, the mobile device may then work to establish a direct wireless connection with that device, to facilitate the registration process.

For instance, if the new IoT device is equipped with a Bluetooth adapter, the user may be able to put the new IoT device in a Bluetooth pairing mode—perhaps by powering on the new IoT device and/or engaging a pairing button on the new IoT device. In this Bluetooth pairing mode, the new IoT device's Bluetooth adapter may broadcast a Bluetooth advertisement message indicating presence of the new IoT device. Further, through an IoT-control app and/or Bluetooth settings interface on the user's mobile device, the user may be able to put the mobile device into a Bluetooth-based discovery mode.

In this Bluetooth-based discovery mode, the user's mobile device may thus scan for a Bluetooth advertisement message and thereby discover the Bluetooth advertisement message broadcast by the new IoT device. Through additional Bluetooth signaling with each other, the mobile device and new IoT device may then establish a direct Bluetooth connection with each other, through which they could then exchange data so as to facilitate registering the new IoT device with the user's IoT account.

Alternatively, if the new IoT device is equipped with a WiFi adapter, the user may be able to put the new IoT device in a WiFi soft-AP mode—likewise possibly by powering on the new IoT device and/or engaging a pairing button on the new IoT device. In this mode, the new IoT device could create a temporary WiFi access point as a soft-AP, and the mobile device could discover and connect with that soft-AP in much the same way that a mobile device would discover and connect with a standard WiFi access point. Further, through an IoT-control app or WiFi settings interface on the user's mobile device, the user may be able to put the mobile device into a WiFi-based discovery mode.

In this soft-AP mode under an example IoT framework, the new IoT device may be set to operate with a framework-specific SSID on one or more WiFi channels. In the WiFi-based discovery mode, the user's mobile device may then send WiFi probes on various WiFi channels, and the new IoT device acting as the soft-AP may respond with a probe response specifying the framework-specific SSID. The mobile device, possibly with user interaction, may then determine that the specified SSID is the applicable SSID, and the mobile device and the new IoT device may then engage in further WiFi signaling with each other to establish a WiFi connection with each other through which they could exchange data so as to registering the new IoT device with the user's IoT account.

While this process of having the user's mobile device discover the new IoT device may work to establish direct wireless connection between the user's mobile device and the new IoT device through which they could then exchange to facilitate registering the new IoT device with the user's IoT account, there are unfortunately some potential downsides to the process.

First, the process might require the new IoT device to enable the Bluetooth pairing mode or soft-AP mode, which may be disruptive to its normal operation. Second, if the process is Bluetooth based, the process would require that the new IoT device be equipped with a Bluetooth adapter, which may add cost. Third, if the process is WiFi based, the process may confuse the user, as the process may require that the user's mobile device connect with a different WiFi access point than normal for a period of time. Further, on some phones, this process may require manual interaction with WiFi settings, which would be inconvenient.

The present disclosure provides an improved technique that may help to address one or more of these problems.

In accordance with the disclosure, the improved technique interestingly reverses the discovery process by having the new IoT device discover presence of the user's mobile device, possibly instead of having the user's mobile device discover presence of the new IoT device.

To facilitate this, the disclosed technique involves having an existing IoT device in the user's IoT ecosystem provide the new IoT device with the MAC address (and possibly operating WiFi channel) of the user's mobile device. For instance, the existing IoT device may regularly broadcast this mobile-phone identification information using framework-specific WiFi signaling, and the new IoT device operating according to the same IoT framework may scan for and detect this WiFi broadcast, directly or through the above-noted mesh network, and thereby receive the information.

Given this information, the new IoT device may then simply scan for and detect WiFi signaling that is threshold strong and that specifies that MAC address, which may indicate that the user's mobile device is nearby. And once the new IoT device thereby discovers presence of the user's mobile device, the new IoT device and mobile device may then exchange information about the new IoT device, and the mobile device may communicate with the cloud-based IoT control server to register the new IoT device with the user's IoT account.

The disclosed technique may further avoid the need to establish a direct wireless connection between the new IoT device and the user's mobile device in order to support the registration process. For instance, rather than having the new IoT device and the mobile device engage in direct wireless communication with each other, the new IoT device may communicate with the mobile device through the existing IoT device, i.e., using the existing IoT device as a proxy.

Namely, the new IoT device may communicate through a direct or mesh WiFi connection with the existing IoT device in accordance with the IoT framework, and the existing IoT device may communicate through the user's WiFi access point and LAN with the IoT control app on the mobile device. For instance, the new IoT device may transmit to the mobile device a packet destined to the IoT control app by transmitting the packet to the existing IoT device with a directive that causes the existing IoT device to transmit the packet via the WiFi access point to the local IP address of the mobile device. Likewise, the IoT control app on the mobile device may respond to the new IoT device by transmitting a packet to the existing IoT device for the existing IoT device to transmit in turn to the new IoT device.

With this arrangement, once the new IoT device detects that the mobile device is nearby, the new IoT device may readily convey to the mobile device's IoT control app, via the existing IoT device, identifying information about the new IoT device, such as the new IoT device's MAC address and perhaps other information such as device type and capabilities for instance. And the mobile device's IoT control app may then engage in internet communication with the cloud-based IoT control server to trigger and facilitate authentication and account registration of the new IoT device.

Further, the mobile IoT control app and/or IoT control server may require the user's approval to add this new IoT device to the user's IoT account before adding the device to the user's IoT account. To facilitate this, the mobile IoT control app may respond to receipt of the information identifying the new IoT device by presenting a prompt for user approval to add the new IoT device to the user's IoT ecosystem. In an example implementation, for instance, the mobile IoT control app may interact with the cloud-based IoT control server, which may use the new IoT device's MAC address as a basis to determine that the new IoT device is compliant with the IoT framework and to look up descriptive information about the new IoT device, and which may respond accordingly to the IoT control app. The mobile IoT control app may then present this descriptive information in its prompt for user approval to add the new IoT device to the user's IoT ecosystem.

Upon receipt of user approval to add the new IoT device, the mobile IoT control app may then likewise interact with the IoT control server, and the IoT control server may add the new IoT device to the user's IoT account and ecosystem and may respond accordingly to the mobile IoT control app. Further, the mobile IoT control app may respond accordingly to the new IoT device, indicating that the new IoT device 104 has been registered with the user's IoT account. And in line with the discussion above, the IoT control server and/or existing IoT device may also push information about this new IoT device to each existing IoT device in the user's IoT ecosystem.

This improved technique may optimally provide an improved user experience for adding a new IoT device to the user's IoT ecosystem. By way of example, when the user powers on the new IoT device, the user may then simply bring the user's mobile device within WiFi range of the new IoT device (i.e., within a WiFi range of sufficient signal strength), and, from the user's perspective, the mobile device may responsively pop up a prompt for user approval to add the new IoT device to the user's IoT ecosystem. The user may then provide user approval in response, and the new IoT device would be added to the user's IoT ecosystem.

These as well as other aspects, advantages and alternatives will become apparent from reading the following detailed description with reference where appropriate to the accompanying drawings. Further, it should be understood that the implementations described in this summary and in the following description and drawings are intended as examples only and that numerous variations could be possible.

DETAILED DESCRIPTION

Example implementations will now be described in the context of example IoT ecosystem at a user's home or other site, where the user has a WiFi access point and a mobile device configured to control the IoT ecosystem. It will be understood, however, that the disclosed principles could apply as well in other scenarios.

More generally, it will also be understood that the arrangements and processes described could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Figure 1:
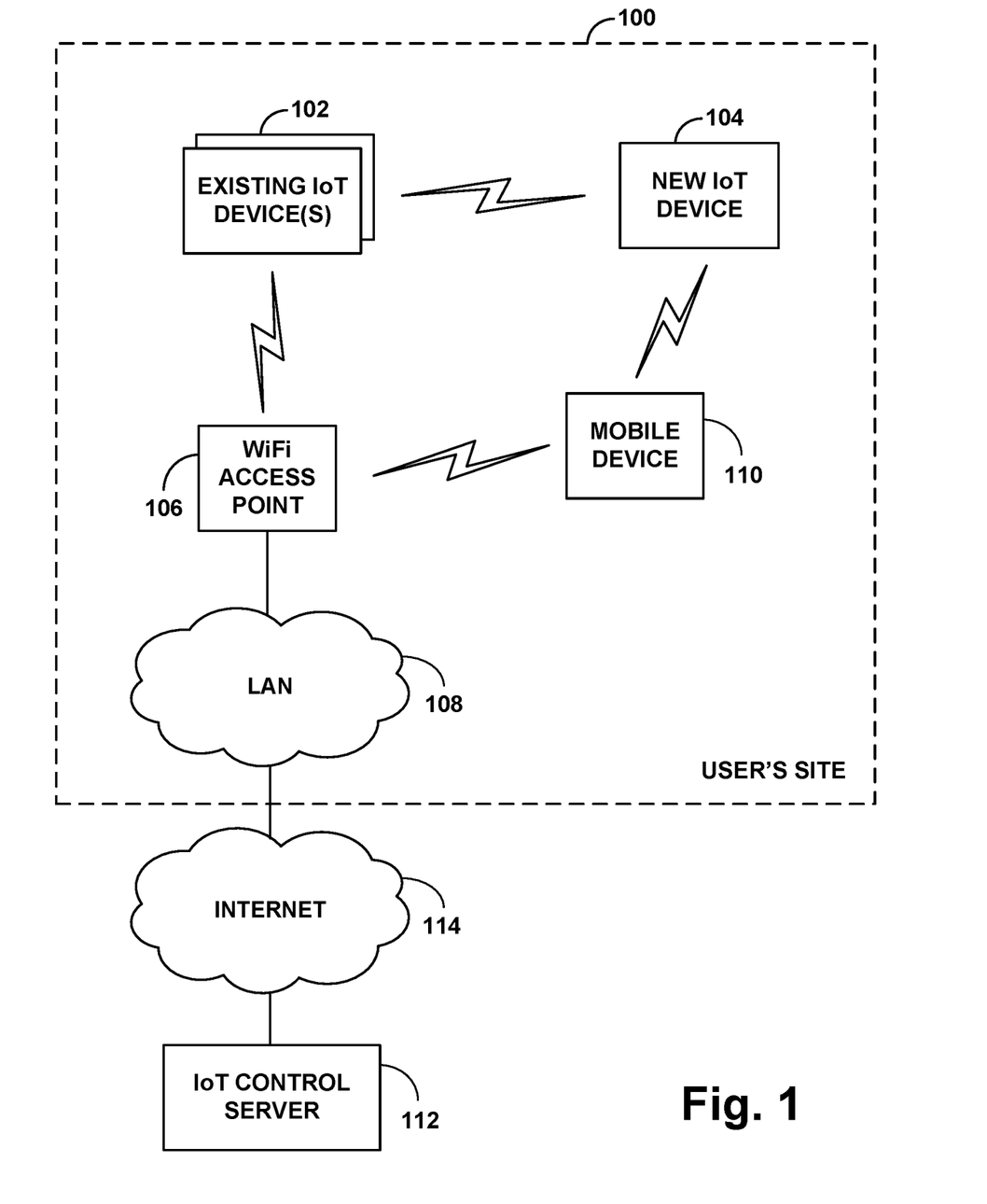
FIG. 1 is a simplified block diagram illustrating an example system.

Referring to the drawings, as noted above, FIG. 1 is a simplified block diagram illustrating an example system in which various disclosed features could be implemented. As shown in FIG. 1, the example system includes at a user's site 100 (such as the user's home) one or more existing IoT devices 102, a new IoT device 104, a WiFi access point 106, a LAN 108, and the user's mobile device 110, and the system further includes a cloud-based IoT control server 112 accessible via the internet 114.

The existing IoT device(s) 102 and new IoT device 104 could be any IoT devices, such as but not limited to any of the examples noted above, preferably both configured to operate according to a common IoT framework. As noted above, the user may have an IoT account with an IoT service provider that operates the IoT control server 112. And each existing IoT device 102 may be an existing IoT device that is currently registered with the user's IoT account. The one or more existing IoT devices 102 may thus form or be part of the user's IoT ecosystem. Further, as noted above, the user's mobile device 110 may run a mobile IoT control app provided by the IoT service provider, which may interact with the IoT control server 112 and allow for user interaction with the user's IoT ecosystem.

In an example implementation, the new IoT device 104 may be a brand new or factory reset IoT device that the user wishes to add to the user's IoT ecosystem to facilitate possible interaction with other IoT devices and/or possible user-control and/or other interaction through the mobile IoT app.

The WiFi access point 106 may provide WiFi service at the user's site 100, operating with a defined SSID on a particular WiFi channel, and possibly requiring use of associated WiFi security credentials.

One or more of the existing IoT device(s) 102 may be served by the WiFi access point 106. For instance, one or more of the existing IoT devices(s) 102 may be provisioned with the SSID and applicable security credentials of the WiFi access point and may have used the SSID and security credentials to authenticate and associate with the access point 106. Further, once connected with the access point 106, the existing IoT device 102 may also have registered with a LAN router (not shown) and obtained a local IP address for use to communicate on the LAN 108 and, through NAT, on the internet 114. Through this path, the existing IoT device 102 may thereby communicate with the cloud-based IoT control server 112.

The user's mobile device 110 in the example arrangement may also be served by the WiFi access point 106. For instance, the mobile device may likewise be provisioned with the SSID and applicable security credentials of the WiFi access point and may also have used the SSID and security credentials to authenticate and associate with the access point 106, and the mobile device may likewise have obtained a local IP address for use to communicate on the LAN 108 and, through NAT, on the internet 114, to communicate with the IoT control server 112. Further, the mobile device may also establish cellular connectivity with the internet 114 and may therefore additionally or alternatively communicate through that cellular connection with the IoT control server 112.

The existing IoT device(s) 102 and new IoT device 104 may also support WiFi communication with each other according to the IoT framework. For instance, as noted above, the IoT framework may define one or more framework-specific WiFi signaling characteristics. Thus, even before the new IoT device 104 has been added to the user's IoT ecosystem, the new device 104 may be able to engage in WiFi communication with each existing IoT device 102 by using the one or more framework-specific WiFi signaling characteristics. Alternatively, the new IoT device 104 and existing IoT device(s) 102 may be able to engage in WiFi communication with each other using more open WiFi signaling standards, among other possibilities.

Further, if there are multiple existing IoT devices 102 in the user's IoT ecosystem, those existing IoT devices, possibly along with one or more other WiFi-equipped devices at the user's site 100, may form a WiFi mesh network as noted above. As a result, the existing IoT devices 102 may be able to engage in WiFi communication through that WiFi mesh network.

This mesh network may therefore facilitate extending WiFi communications of an existing WiFi device, through one or more other mesh network nodes. For instance, an existing IoT device may broadcast or otherwise transmit a WiFi signal, and that WiFi signal may pass through one or more other mesh network nodes before being output and received by a destination device. Likewise, a WiFi transmission from source device to an existing IoT device may pass through one or more mesh network nodes before being output and received by that existing IoT device.

Such a mesh network arrangement may support the above-noted WiFi communication between the existing IoT device 102 and the new IoT device 104. For instance, the existing IoT device 102 may broadcast or otherwise transmit a framework-compliant WiFi signal, and that signal may pass through one or more other mesh network nodes before being output and received by the new IoT device 104. Likewise, the new IoT device 104 may broadcast or otherwise transmit a framework-compliant WiFi signal, and that signal may pass through one or more other mesh network nodes before being output and receive by the existing IoT device 102.

Further, such a mesh network arrangement may enable an existing IoT device 102 to access to the LAN 108 and internet 114 so as to communicate with the user's mobile device 110 and/or with the cloud-based IoT control server 112, even if the existing IoT device 102 is not itself connected with the WiFi access point 106. For instance, the existing IoT device 102 may engage in such communication through one or more mesh network nodes, including an edge node that itself may be served by the access point 106 and therefore provide a path to communicate on the LAN 108. Other arrangements are possible as well.

Note also that existing IoT devices 102 might be able to communicate with each other through the WiFi access point 106 and LAN 108. For instance, if each of the existing IoT devices 102 is served by the WiFi access point 106 or has connectivity to the WiFi access point 106 through one or more other of the existing IoT devices 102, the existing IoT devices may be able to engage in IP communication with each other between their local IP addresses. This form of communication may also carry signaling that is framework-specific, among other possibilities.

Figure 2:
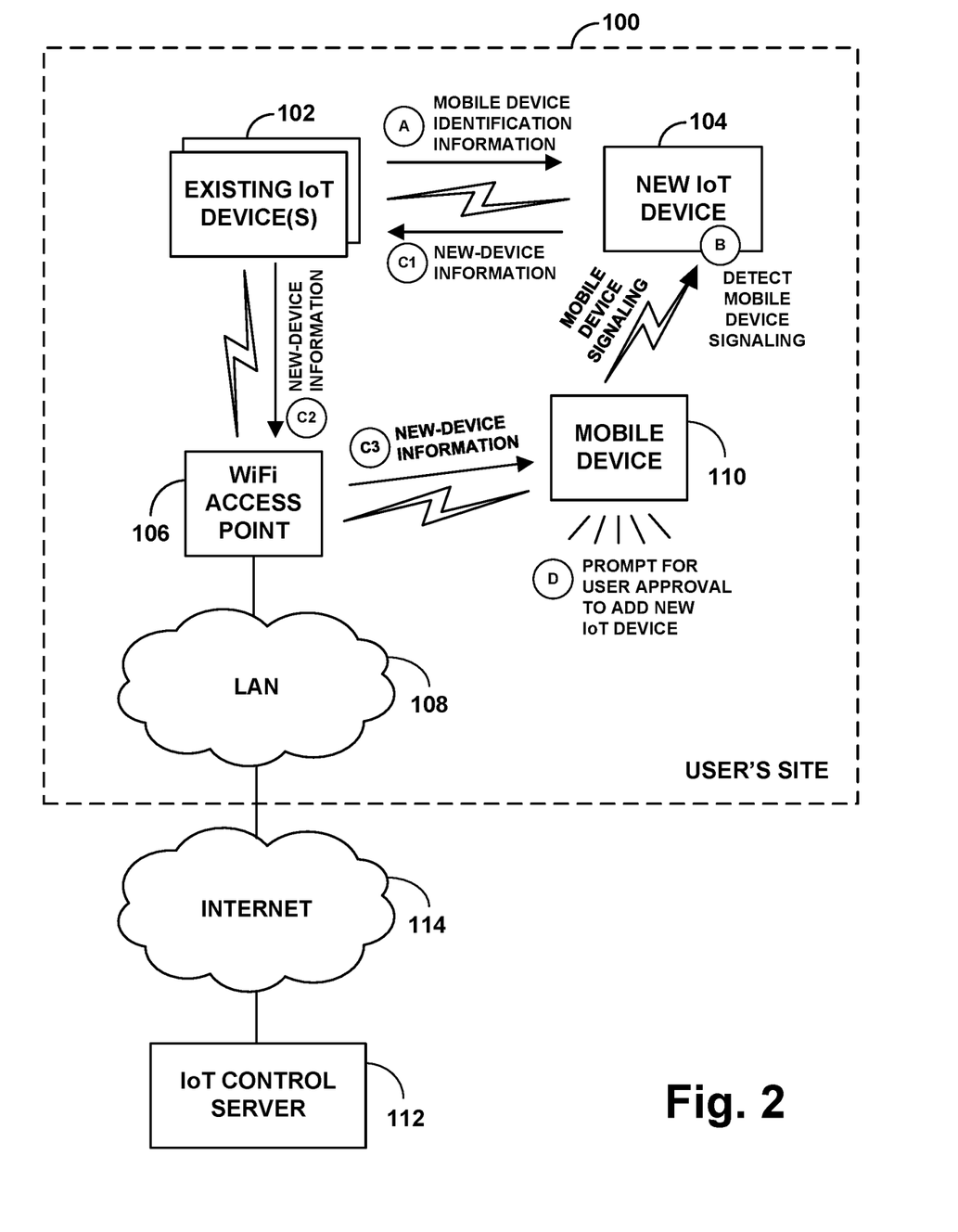
FIG. 2 illustrates an example process that could be carried out by and among devices of FIG. 1 to facilitate adding of a new IoT device to the user's IoT account and ecosystem.

FIG. 2 next illustrates an example process that could be carried out by and among the devices of FIG. 1 to conveniently facilitate adding of the new IoT device 104 to the user's IoT account and ecosystem.

As shown in FIG. 2, at step A, an existing IoT device 102 broadcasts identification information of the user's mobile device 110, and the new IoT device 104 receives the broadcast and thus receives the mobile device identification information carried by the broadcast.

As noted above, this mobile device identification information could include the MAC address of the mobile device 110 and possibly the WiFi channel on which the mobile device operates. The existing IoT device 102 may be provisioned with this information by receiving the information from the IoT control server 112, the mobile device 110 (e.g., mobile IoT control app), and/or another existing IoT device 102. For instance, the IoT control server 112 may itself be provisioned with this mobile device identification information, possibly informed by the mobile IoT control app when that mobile IoT control app is logged in to the user's IoT account at the control sever 112, and the IoT control server 112 may transmit the mobile device identification information to the existing IoT device 102, which may store the information in an account record.

An existing IoT device 102 may broadcast this mobile device identification information using one or more framework-specific WiFi signaling characteristics such as those noted above, in order to enable the new IoT device 104 to detect the signaling and obtain the mobile device identification information. Thus, when the new IoT device 104 receives the WiFi signaling, the new IoT device 104 may correspondingly read the mobile device identification information from the WiFi signaling.

For instance, the existing IoT device 102 may use a framework-specific WiFi frame format and/or include a framework-specific codeword in a header to indicate that the WiFi signaling carries the mobile device identification information, and the new IoT device 104 may look for one or more WiFi frames that have that specific frame format and/or codeword, as being the WiFi signaling carrying the mobile device identification information. Further, the existing IoT device 102 may include the mobile device identification information in an extensible markup format or other predefined structure within a data or payload portion of the WiFi signaling, and the new IoT device 104 may accordingly read the mobile identification information from the WiFi signaling.

If there are multiple existing IoT devices 102, all of the existing IoT devices 102 may broadcast this mobile device identification information, or just one or some other proper subset of the existing IoT devices 102 may broadcast this mobile device identification information. For instance, just a given one of the multiple existing IoT devices 102 may be configured to broadcast this mobile device identification information, and that existing IoT device's broadcast of WiFi signaling carrying the mobile device identification information might pass through one or more mesh network nodes before being output and received by the new IoT device 104.

When the new IoT device 104 receives the WiFi signaling carrying the mobile device identification information, the new IoT device 104 may read the mobile device identification information from the WiFi signaling.

Further, the broadcasting of the mobile device identification information could be done periodically, with a period set by engineering design to duration that will enable what is viewed as quick enough discovery of the mobile device 110 in the present process. Once the user powers on the new IoT device 104, the new IoT device 104 may thus quickly receive the broadcast from the existing IoT device 102, and the new IoT device 104 may thereby quickly receive the mobile device identification information.

Continuing with reference to FIG. 2, at step B, having read the mobile device identification information from the WiFi signaling broadcast by the existing IoT device 102, the new IoT device 104 may then use that mobile device identification information as a basis to scan for and detect nearby presence of the user's mobile device 110. As noted above, this could happen after the user has powered on the new IoT device 104 (or for that matter factory reset the new IoT device 104) when the user then brings the mobile device 110 close enough to the new IoT device.

In an example implementation, with the mobile device 110 being served by the WiFi access point 106, the mobile device 110 may engage in WiFi transmission to the access point 106. The mobile device may repeatedly engage in such transmission and/or may engage in such transmission in response to one or more triggering events. Without limitation, for instance, if the user opens the IoT control app on the mobile device 110, that app may cause the mobile device 110 to engage in WiFi transmission more frequently to facilitate this process. Other triggers for WiFi transmission from the mobile device 110, and other types of WiFi transmissions from the mobile device 110, may be possible as well.

As noted above, the WiFi transmission from the mobile device may carry the mobile device's MAC address as a source MAC address and be on a particular WiFi channel. Given this or other such mobile device identification information broadcast from the existing IoT device, the new IoT device may therefore simply scan that WiFi channel in search of WiFi signaling carrying the mobile device's indicated MAC address as a source MAC address, as an indication that the user's mobile device 110 is in range.

From a user-experience standpoint, the new IoT device 104 may further check to determine if and when the WiFi signaling from the mobile device 110 is strong enough to indicate that the mobile device 110 is in relatively close proximity to the new IoT device 104, as a basis to justify proceeding with the device-addition process. For instance, the new IoT device 104 may monitor a receive signal strength indicator (RSSI) of the detected WiFi signaling from the mobile device 110 and determine when that RSSI level is at least as high as a predefined minimum threshold level set by engineering design to indicate that the mobile device 110 is close enough to the new IoT device 104. Further, the new IoT device 104 may require that it detect at least a predefined threshold minimum number of WiFi frames that the new IoT device 104 finds to have at least the predefined minimum RSSI, as a basis to verify the mobile device proximity.

(Note that other ways to detect close enough proximity of the mobile device 110 to the new IoT device 104 may also be possible. Without limitation, for instance, if the new IoT device 104 is equipped with a microphone and the mobile device 110 emits audio detectable by the new IoT device 104, the new IoT device 104 may detect that the mobile device is close enough when the new IoT device 104 detects the emitted audio with at least predefined threshold high volume. Further, other distance determination mechanisms, such as but not limited to WiFi-ranging and triangulation, may come into play.)

At step C (parts C1, C2, and C3), in response to the new IoT device 104 thereby discovering close proximity of the user's mobile device 110, the new IoT device 104 may transmit to the mobile device some identification information of the new IoT device 104, i.e., new-device information. As noted above, this new-device information may include the MAC address of the new device and perhaps certain more descriptive information about the new device, such as its device type and capabilities.

In an example implementation, at this stage, the new IoT device 104 does not have a peer-to-peer connection with the mobile device 110 through which to engage in substantive communication with the mobile device 110, and the new IoT device 104 is also not connected with the WiFi access point 106 and is therefore unable to engage in substantive IP-based communication over the LAN 108 with the mobile device 110.

However, the new IoT device 104 may be able to engage in framework-specific WiFi communication with the existing IoT device 102, and the existing IoT device 102 may be able to engage in IP-based communication with the mobile device 110. Therefore, as discussed above, the new IoT device 104 may conveniently engage in substantive communication with the mobile device 110 by using the existing IoT device 102 as a proxy for those communications. (Though note that, in an alternative implementation, this proxying could be done by an existing IoT device that is different than the IoT device that broadcasted the mobile device identification information, and/or by a combination of multiple existing IoT devices, among other possibilities.)

Namely, as discussed above, the new IoT device 104 may transmit information to the mobile device 110 by transmitting the information in WiFi signaling to the existing IoT device 102 in a manner that causes the existing IoT device 102 to forward the information via the WiFi access point 106 and the LAN 108 to the mobile device 110. And the mobile device 110 may respond to the new IoT device 104 by engaging in IP communication to the existing IoT device 102 in a manner that causes the existing IoT device 102 to forward the communication through WiFi communication to the new IoT device 104.

Thus, the new IoT device 104 may transmit its new-device information to the mobile device 110 by transmitting the new-device information in WiFi signaling to the existing IoT device 102 at step C1, with the existing IoT device 102 then forwarding the new-device information in IP signaling to the mobile device 110 via the WiFi access point 106, at steps C2 and C3. In accordance with an example IoT framework, the existing IoT device could include in its IP signaling to the mobile device 110 a port number, app identifier, or other data that will cause the mobile device 110, upon receipt of IP signaling, to pass the received new-device information to the IoT control app running on the mobile device 110.

At step D, upon receipt of this new-device information at the mobile device 110, the IoT control app running on the mobile device 110 may then present a prompt for the user to approve adding the new IoT device 104 to the user's IoT account and ecosystem. For instance, the IoT control app may cause the mobile device 110 to present such a prompt on a display of the mobile device. Further, this may also cause the mobile device 110 to flash a light and/or provide haptic feedback to alert the user that the mobile device 110 is presenting the prompt.

Figure 3:
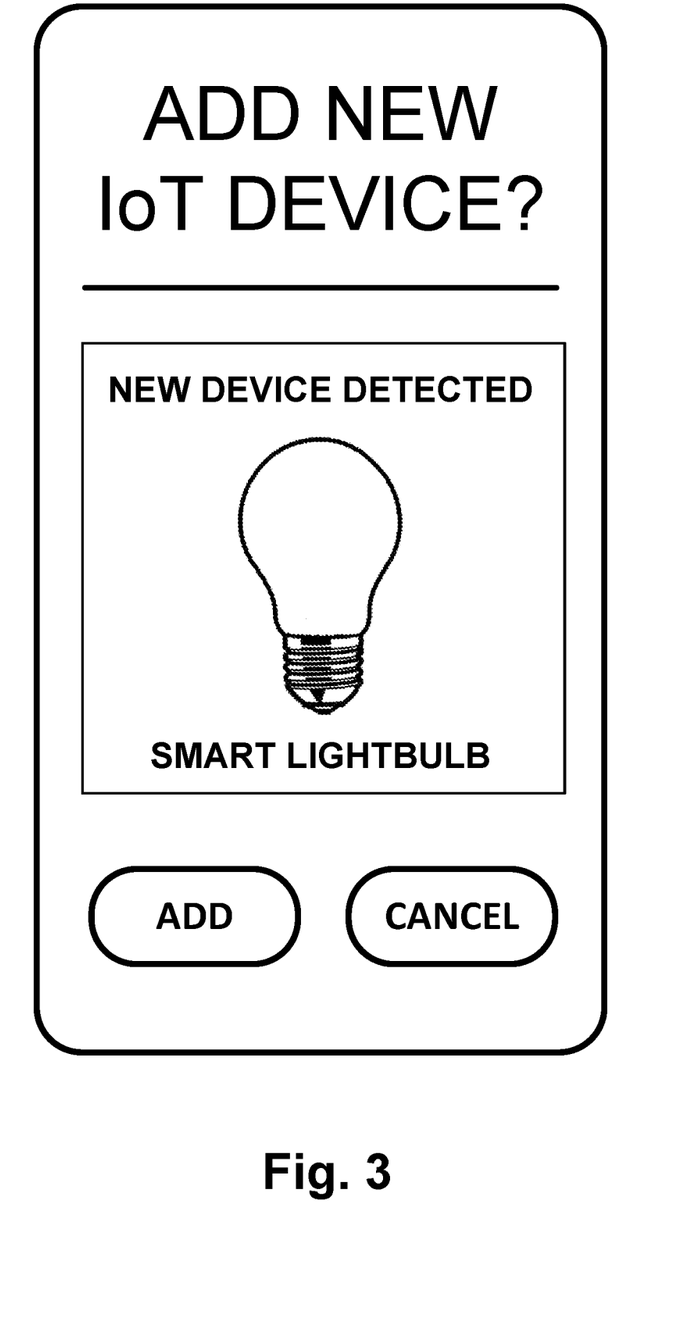
FIG. 3 is an illustration of an example prompt for user approval to add a new IoT device to the user's IoT ecosystem.

FIG. 3 is an illustration of an example such prompt in a non-limiting example scenario where the new IoT device 104 is an IoT lightbulb. As shown in FIG. 3, the prompt informs the user that a new IoT lightbulb has been detected, and the prompt asks the user to approve adding that lightbulb as an new IoT device to the user's IoT system, showing a picture of the lightbulb and providing ADD and CANCEL buttons. The user may then touch the ADD button to approve adding the new IoT device 104 to the user's IoT account and ecosystem.

To facilitate the IoT control app presenting this prompt for user approval, the IoT control app may make use of the new-device information that the mobile device 110 received from the new IoT device 104.

For example, if the new-device information describes the new IoT device 104 as a lightbulb of a particular type, the IoT control app may use that information as a basis to cause the prompt to describe the new IoT device 104 as a lightbulb and to show the picture of the lightbulb. As another example, if the new-device information includes the new IoT device's MAC address, the IoT control app could query an internet-based MAC-mapping database (not shown) to map that MAC address to an indication that the new IoT device 104 is a lightbulb of a particular type, and could use that information similarly to structure the prompt.

Further, the IoT control app may interact with the cloud-based IoT control server 112 to authenticate the new IoT device 104 before presenting the prompt for user approval to add the new IoT device 104. And the IoT control app may receive from the IoT control server 112 information about the new IoT device to include in the prompt for user approval.

For instance, the IoT control app may send to the IoT control server 112 the new IoT device's MAC address, the IoT control server 112 may use perform a database lookup as a basis to confirm that the device having that MAC address is compliant with the IoT framework, and possibly to obtain descriptive information about the new IoT device 104. The IoT control server 112 may then respond to the IoT control app on the mobile device 110 with a positive authentication result and possibly with new IoT device descriptive information. And the IoT control app may then responsively present the prompt for user approval.

Further, at step E, responsive to the user approving the adding of the new IoT device to the user's IoT account and ecosystem, the IoT control app may interact with the IoT control server 112 to process that addition of the new IoT device 104.

For instance, the IoT control app may transmit to the IoT control server 112 a user-approval response or other message that will trigger the IoT control server adding the new IoT device 104 to the user's IoT account. If the IoT control server 112 had not already authenticated the new IoT device, the IoT control server 112 may do so at this point, likewise based on provided information about the new IoT device 104, as a condition to proceeding with the adding of the new IoT device 104 to the user's IoT account.

In line with the discussion above, the adding of the new IoT device 104 to the user's IoT account may involve adding the new IoT device 104 to the user's account record at the IoT control server, indicating that the new IoT device 104 is now one of the IoT devices registered with the user's IoT account and indicating other information about the new IoT device 104.

Further, the adding of the new IoT device 104 may also involve the IoT control server 112 provisioning the new IoT device 104 with associated IoT account information, such as (i) an indication that the new IoT device is now registered with the account, (ii) a listing of the other IoT devices in the user's IoT ecosystem, and (iii) various other account-related information as discussed above, among other possibilities. For instance, the IoT control server 112 may provide this information in a response to the IoT control app on the mobile device 110, and the IoT control app may in turn send the information to the new IoT device via the existing IoT device 102. In addition, the IoT control server 112 may update IoT account information at each existing IoT device 102 to add the new IoT device 104 as a registered IoT device.

In an alternative implementation, rather than the IoT control server 112 providing all of this IoT account information to the new IoT device, one or more of the existing IoT devices 102 may provide some or all of this IoT account information to the new IoT device. For instance, the IoT control server 112 may update provisioning at each existing IoT device 102, and the existing IoT devices 102 may propagate the account information to the new IoT device 104, among other possibilities.

This IoT account information may enable the new IoT device 104 to operate as an existing IoT device, to then facilitate carrying out the process as to another new IoT device. For instance, the IoT account information may include data that enables the new IoT device 104 to authenticate and associate with the WiFi access point 106 so that the new IoT device 104 can then operate on the LAN 108 to engage in IP communication with the mobile device 110. Further, the IoT account information listing of other IoT devices in the user's IoT ecosystem may enable the new IoT device 104 to interact in various ways with those other IoT devices.

In a further alternative implementation, rather than or in addition to the existing IoT device 102 proxying the new IoT device's information to the mobile device 110, the existing IoT device 102 may proxy the new IoT device's information to the IoT cloud server 112, and the IoT cloud server 112 may then authenticate the new IoT device 104 and proxy the new IoT device's information to the mobile device 110 in order to trigger presentation of the prompt for user approval to add the new IoT device 104.

In this alternative implementation, for instance, once the new IoT device 104 scans for and detects nearby presence of mobile device 110 in response to receiving the WiFi broadcast carrying the mobile device identification information, the new IoT device 104 could transmit its new-device information to the existing IoT device 102, and the existing IoT device 102 could then forward that new-device information to the IoT control server 112, via the WiFi access point 106, LAN 108, and internet 114. Upon receipt of this new-device information, the IoT control server 112 may then authenticate the new IoT device 104 (e.g., confirming based on the new IoT device's MAC address that the new IoT device is compliant with the IoT framework and possibly obtaining descriptive information about the new IoT device 104). Further, the IoT control server 112 may then transmit to the IoT control app running on the mobile device 110 a control message informing the mobile device 110 of the presence of the new IoT device 104 and providing the mobile device 110 with at least some of the information about the new IoT device 104, and the IoT control app may responsively present the prompt for user approval to add the new IoT device 104.

In response to receipt of the user approval, the IoT control app may then likewise interact with the IoT control server 112, and the IoT control server 112 may add the new IoT device 104 to the user's IoT account and ecosystem. Further, the IoT control server 112 may respond accordingly to the new IoT device 104, via the existing IoT device 102, indicating that the new IoT device 104 has been registered with the user's IoT account and provisioning the new IoT device 104 with associated IoT account information. Still further, as noted above, the IoT control server 112 and/or the existing IoT device 102 may likewise push information about the new IoT device 104 to each existing IoT device 102 in the user's IoT ecosystem.

Note that various communications described above involving the IoT devices, IoT control app, and IoT control server could be encrypted for security. For instance, each IoT device may have a private key, and the IoT control server may have each device's corresponding public key (e.g., ascertained based on a MAC-address lookup). So the IoT control server may be able to use a given device's public key to encrypt communications that the IoT control server will send to that given IoT device, and the given IoT device may be able to use the device's private key to decrypt those communications.

Note also that the above process may also apply in different scenarios. Without limitation, for instance, in addition to applying as to a new IoT device, the process could apply when an existing device moves to a new site. For example, if a user has a set of existing IoT devices 102 at the user site 100 shown in Figure and the user takes a given one of those existing IoT devices to a different site, such as a vacation home, that given IoT device may detect that it is at a new location and may then operate as a new IoT device at that new location under the process described above. The IoT device may detect that it is at a new location by detecting a new WiFi signature and/or in other ways.

Further, while the above discussion has focused on use of WiFi as a baseline communication mechanism among the IoT devices, it will be understood that the disclosed principles could apply as well with respect to other wireless communication protocols, not limited to WiFi.

Figure 4:
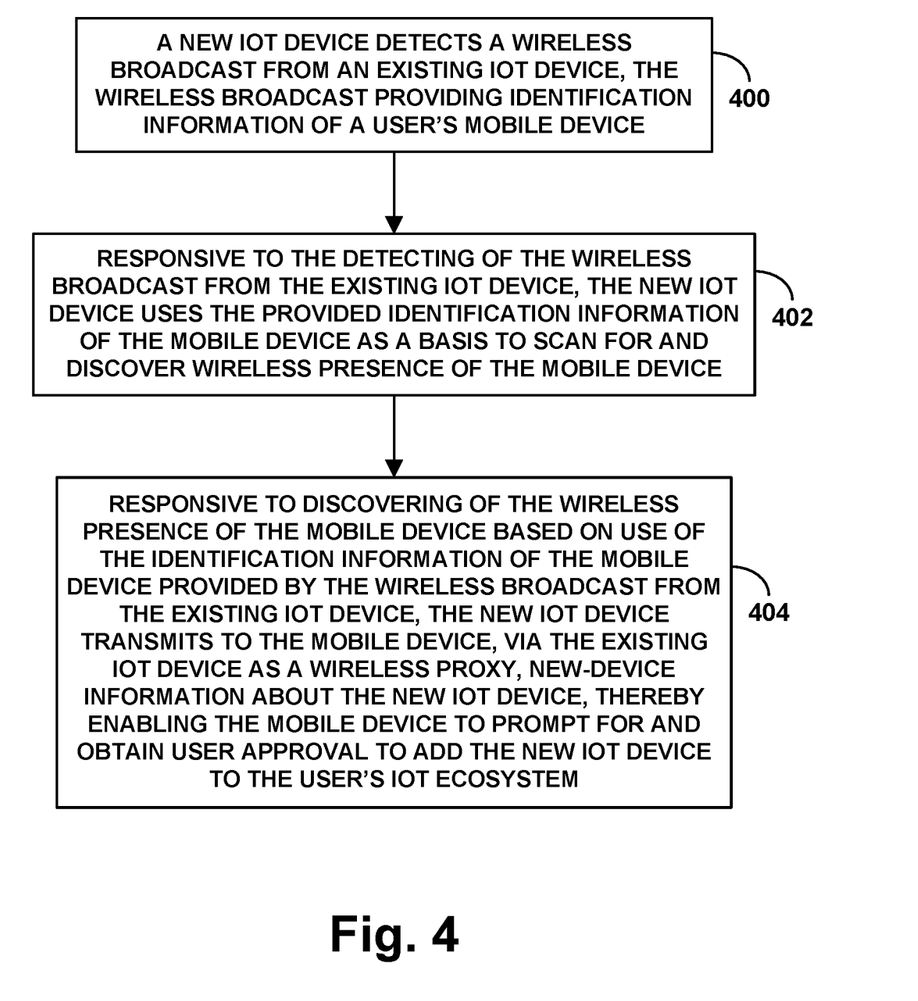
FIG. 4 is a flow chart illustrating an example method.

FIG. 4 is a flow chart illustrating a method that could be carried out in accordance with the present disclosure, to facilitate adding a new IoT device to an IoT ecosystem, in a scenario where the IoT ecosystem includes an existing IoT device, and where a mobile device is configured to control the IoT ecosystem. For instance, this method could be carried out as to an IoT device that is new by being factory reset or by not having been previously used, or perhaps effectively by being moved to a new IoT site.

As shown in FIG. 4, at block 400, the method includes the new IoT device detecting a wireless broadcast from the existing IoT device, the wireless broadcast providing identification information of the mobile device. At block 402 the method then includes, responsive to the detecting of the wireless broadcast from the existing IoT device, the new IoT device using the provided identification information of the mobile device as a basis to scan for and discover wireless presence of the mobile device.

And at block 404, the method includes, responsive to the discovering of the wireless presence of the mobile device based on use of the identification information of the mobile device provided by the wireless broadcast from the existing IoT device, the new IoT device transmitting to the mobile device, via the existing IoT device as a wireless proxy, new-device information about the new IoT device. As discussed above, the transmitting of the new-device information via the existing IoT device to the mobile device may thereby enable the mobile device to prompt for and obtain user approval to add the new IoT device to the IoT ecosystem.

In line with the discussion above, the method may additionally include, responsive to detecting the wireless broadcast from the existing IoT device, the new IoT device reading, from the wireless broadcast from the existing IoT device, the provided identification information of the mobile device. And the act of the new IoT device using the provided identification information of the mobile device responsive to detecting by the new IoT device the wireless broadcast from the existing IoT device could involve the new IoT device using the provided identification information of the mobile device responsive to reading by the new IoT device from the wireless broadcast the provided identifying information of the mobile device.

As further discussed above, the provided identification information of the mobile device could include a MAC address of the mobile device. And the act of the new IoT device using the provided identification information of the mobile device as a basis to scan for and discover wireless presence of the mobile device could involve the new IoT device scanning in search of a wireless communication based on the wireless communication specifying the MAC address as a source MAC address of the wireless communication. For instance, the new IoT device could monitor to detect one or more wireless frames having that source MAC address.

In addition, as discussed above, the act of the new IoT device using the provided identification information of the mobile device as a basis to scan for and discover wireless presence of the mobile device could involve the new IoT device discovering the wireless presence of the mobile device based on detecting that a receive signal strength of the wireless communication at the new IoT device is at least as high as a predefined threshold level of signal strength indicating that the mobile device is proximate to the new IoT device.

Further, as discussed above, the wireless broadcast from the existing IoT device that provides the identification information of the mobile device could be a WiFi broadcast from the existing IoT device. And in that case, the act of the new IoT device using the provided identification information of the mobile device as a basis to scan for and discover wireless presence of the mobile device could involve the new IoT device monitoring to detect presence of a WiFi communication based on the WiFi communication (i) having the identification information of the mobile device and (ii) having a receive signal strength at the new IoT device that is at least as high as a predefined threshold level of signal strength indicating that the mobile device is proximate to the new IoT device.

Still further, as discussed above, the act of the new IoT device transmitting to the mobile device, via the existing IoT device as a wireless proxy, the new-device information about the new IoT device could involve transmitting the new-device information in WiFi signaling from the new IoT device to the existing IoT device, to enable the existing IoT device to forward the new-device information to the mobile device (e.g., via a WiFi access point).

Yet further, as discussed above, the method could additionally include, based on the user approval to add the new IoT device to the IoT ecosystem, the new IoT device becoming added to the IoT ecosystem, thereby enabling the mobile device to control the new IoT device. For instance, as discussed above, upon authentication of the new IoT device and/or with other steps, an IoT control server adding the new IoT device to an associated IoT account and accordingly provisioning the new IoT device.

Figure 5:
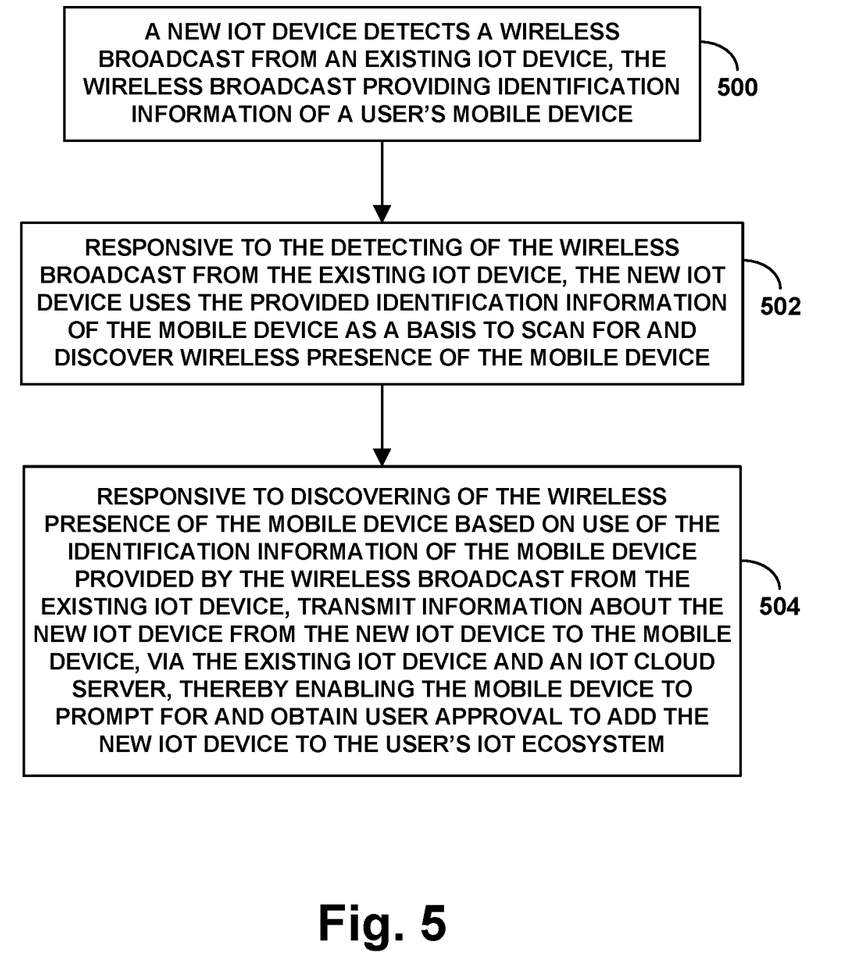
FIG. 5 is another flow chart illustrating an example method.

FIG. 5 is another flow chart illustrating an example method that could be carried out in accordance with the present disclosure, to facilitate adding a new IoT device to an IoT ecosystem, in a scenario where the IoT ecosystem includes an existing IoT device, and where a mobile device is configured to control the IoT ecosystem. As shown in FIG. 5, at block 500, the method includes a new IoT device detecting a wireless broadcast from an existing IoT device, the wireless broadcast providing identification information of a user's mobile device. At block 502, the method then includes, responsive to the detecting of the wireless broadcast from the existing IoT device, the new IoT device using the provided identification information of the mobile device as a basis to scan for and discover wireless presence of the mobile device. And at block 504, the method includes, responsive to discovering of the wireless presence of the mobile device based on use of the identification information of the mobile device provided by the wireless broadcast from the existing IoT device, transmitting information about the new IoT device from the new IoT device to the mobile device, via the existing IoT device and an IoT cloud server, thereby enabling the mobile device to prompt for and obtain user approval to add the new IoT device to the user's IoT ecosystem.

Figure 6:
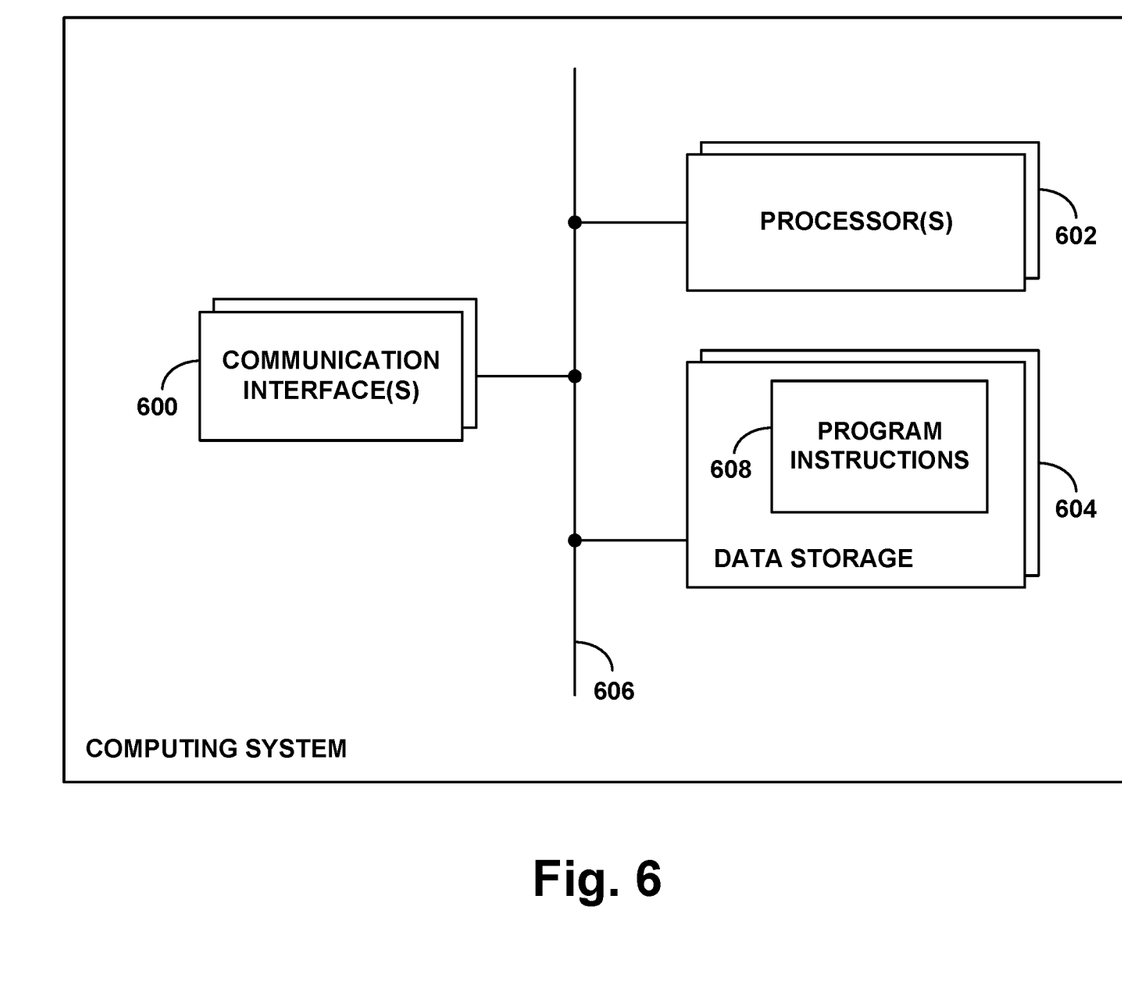
FIG. 6 is a simplified block diagram of an example computing system.

FIG. 6 is a simplified block diagram of a computing system, which could be implemented in a representative IoT device, IoT control system, mobile device, or other device or system described here. As shown in FIG. 6, the example computing system could include at least one communication interface 600, at least one processor 602, and at least one non-transitory data storage 604, which could integrated together or communicatively linked together by a system bus, network, or one or more other connection mechanisms 606.

The at least one communication interface 600 could comprise one or more interfaces to facilitate wired and/or wireless communication with one or more other entities. Examples of such interfaces could include, without limitation, wired Ethernet interfaces and/or WiFi interfaces.

The at least one processor 602 could comprise one or more general purpose processing units (e.g., microprocessors) and/or one or more specialized processing units (e.g., digital signal processors, dedicated audio processors, dedicated watermark processors, etc.) Further, the at least one non-transitory data storage 604 could comprise one or more volatile and/or non-volatile storage components (e.g., flash, optical, magnetic, ROM, RAM, EPROM, EEPROM, etc.), which may be integrated in whole or in part with the at least one processor 602. As further shown, the at least one non-transitory data storage 604 could store program instructions 608, which may be executable by the at least one processor 602 to carry out various computing-system operations described herein.

The present disclosure also contemplates at least one non-transitory computer readable medium that is encoded with, stores, or otherwise embodies program instructions executable by at least one processor to carry out various operations as described above.

Exemplary embodiments have been described above. Those skilled in the art will understand, however, that changes and modifications may be made to these embodiments without departing from the true scope and spirit of the invention.

We claim:

1. A method to facilitate adding a new Internet of Things (IoT) device to an IoT ecosystem, wherein a mobile device is configured to control the IoT ecosystem, the method comprising:
   using, by the new IoT device, identification information of the mobile device as a basis to scan for and discover wireless presence of the mobile device; and
   responsive to the discovering of the wireless presence of the mobile device based on use of the identification information of the mobile device, transmitting by the new IoT device to the mobile device new-device information about the new IoT device, wherein transmitting the new-device information to the mobile device enables the mobile device to prompt for and obtain user approval to add the new IoT device to the IoT ecosystem.

2. The method of claim 1, wherein the IoT ecosystem further includes an existing IoT device, and wherein transmitting by the new IoT device to the mobile device the new-device information about the new IoT device is via the existing IoT device as a wireless proxy.

3. The method of claim 1,
   wherein the identification information of the mobile device comprises a Media Access Control (MAC) address of the mobile device, and
   wherein using by the new IoT device the identification information of the mobile device as a basis to scan for and discover wireless presence of the mobile device comprises scanning by the new IoT device in search of a wireless communication based on the wireless communication specifying the MAC address as a source MAC address of the wireless communication.

4. The method of claim 3, wherein using by the new IoT device the identification information of the mobile device as a basis to scan for and discover wireless presence of the mobile device comprises:
   discovering the wireless presence of the mobile device based on detecting that a receive signal strength of the wireless communication at the new IoT device is at least as high as a predefined threshold level of signal strength indicating that the mobile device is proximate to the new IoT device.

5. The method of claim 1,
   wherein using by the new IoT device the identification information of the mobile device as a basis to scan for and discover wireless presence of the mobile device comprises:
   monitoring by the new IoT device to detect presence of a WiFi communication based on the WiFi communication (i) having the identification information of the mobile device and (ii) having a receive signal strength at the new IoT device that is at least as high as a predefined threshold level of signal strength indicating that the mobile device is proximate to the new IoT device.

6. The method of claim 1, wherein transmitting by the new IoT device to the mobile device the new-device information about the new IoT device comprises transmitting the new-device information in WiFi signaling from the new IoT device, to enable forwarding of the new-device information to the mobile device.

7. The method of claim 6, wherein forwarding of the new-device information to the mobile device is via a WiFi access point.

8. The method of claim 1, further comprising:
   based on the user approval to add the new IoT device to the IoT ecosystem, the new IoT device becoming added to the IoT ecosystem, thereby enabling the mobile device to control the new IoT device.

9. The method of claim 1, wherein the new IoT device is new by being factory reset or by not having been previously used.

10. A system to facilitate adding a new Internet of Things (IoT) device to an IoT ecosystem, wherein a mobile device is configured to control the IoT ecosystem, the system comprising:
    at least one processor in the new IoT device;
    at least one non-transitory data storage in the new IoT device;
    program instructions stored in the at least one non-transitory data storage and executable by the at least one processor to cause the new IoT device to carry out operations including:
      using identification information of the mobile device as a basis to scan for and discover wireless presence of the mobile device, and
      responsive to the discovering of the wireless presence of the mobile device based on use of the identification information of the mobile device, transmitting to the mobile device new-device information about the new IoT device, wherein transmitting the new-device information to the mobile device enables the mobile device to prompt for and obtain user approval to add the new IoT device to the IoT ecosystem.

11. The system of claim 10, wherein the IoT ecosystem further includes an existing IoT device, and wherein transmitting by the new IoT device to the mobile device the new-device information about the new IoT device is via the existing IoT device as a wireless proxy.

12. The system of claim 10,
    wherein the provided identification information of the mobile device comprises a Media Access Control (MAC) address of the mobile device, and
    wherein using the identification information of the mobile device as a basis to scan for and discover wireless presence of the mobile device comprises scanning in search of a wireless communication based on the wireless communication specifying the MAC address as a source MAC address of the wireless communication.

13. The system of claim 12, wherein using the identification information of the mobile device as a basis to scan for and discover wireless presence of the mobile device comprises:
discovering the wireless presence of the mobile device based on detecting that a receive signal strength of the wireless communication at the new IoT device is at least as high as a predefined threshold level of signal strength indicating that the mobile device is proximate to the new IoT device.

14. The system of claim 10,
wherein using the provided identification information of the mobile device as a basis to scan for and discover wireless presence of the mobile device comprises:
monitoring to detect presence of a WiFi communication based on the WiFi communication (i) having the identification information of the mobile device and (ii) having a receive signal strength at the new IoT device that is at least as high as a predefined threshold level of signal strength indicating that the mobile device is proximate to the new IoT device.

15. The system of claim 10, wherein transmitting to the mobile device the new-device information about the new IoT device comprises transmitting the new-device information in WiFi signaling from the new IoT device, to enable forwarding of the new-device information to the mobile device.

16. The system of claim 15, wherein forwarding of the new-device information to the mobile device is via a WiFi access point.

17. The system of claim 10, wherein the operations additionally include:
based on the user approval to add the new IoT device to the IoT ecosystem, the new IoT device becoming added to the IoT ecosystem, thereby enabling the mobile device to control the new IoT device.

18. The system of claim 10, wherein the new IoT device is new by being factory reset or by not having been previously used.

19. At least one non-transitory computer-readable medium having stored thereon program instructions executable by at least one processor to cause a new Internet of Things (IoT) device to carry out operations to facilitate adding the new IoT device to an IoT ecosystem, wherein a mobile device is configured to control the IoT ecosystem, the operations comprising:
using identification information of the mobile device as a basis to scan for and discover wireless presence of the mobile device; and
responsive to the discovering of the wireless presence of the mobile device based on use of the identification information of the mobile device, transmitting to the mobile device new-device information about the new IoT device, wherein transmitting the new-device information to the mobile device enables the mobile device to prompt for and obtain user approval to add the new IoT device to the IoT ecosystem.

20. The at least one non-transitory computer-readable medium of claim 19,
wherein the identification information of the mobile device comprises a Media Access Control (MAC) address of the mobile device, and
wherein using the identification information of the mobile device as a basis to scan for and discover wireless presence of the mobile device comprises monitoring to detect presence of a WiFi communication based on the WiFi communication (i) specifying the MAC address as a source MAC address of the wireless communication and (ii) having a receive signal strength at the new IoT device that is at least as high as a predefined threshold level of signal strength indicating that the mobile device is proximate to the new IoT device.

* * * * *